United States Patent [19]

Lewis

[11] 4,383,264

[45] May 10, 1983

[54] DEMAND DROP FORMING DEVICE WITH INTERACTING TRANSDUCER AND ORIFICE COMBINATION

[75] Inventor: Arthur M. Lewis, Redding, Conn.

[73] Assignee: Exxon Research and Engineering Co., Florham Park, N.J.

[21] Appl. No.: 160,613

[22] Filed: Jun. 18, 1980

[51] Int. Cl.³ .......... G01D 15/18

[52] U.S. Cl. .......... 346/140 R

[58] Field of Search .......... 346/140, 75

[56] References Cited

U.S. PATENT DOCUMENTS

| | | | |
|---|---|---|---|
| 3,683,396 | 8/1972 | Keur | 346/75 X |
| 3,708,118 | 1/1973 | Keur | 346/75 X |
| 3,848,118 | 11/1974 | Rittberg | 346/140 X |
| 3,900,162 | 8/1975 | Titus | 346/75 X |
| 3,940,773 | 2/1976 | Mizoguchi | 346/140 |
| 3,946,398 | 3/1976 | Kyser | 346/140 X |
| 3,961,337 | 6/1976 | Jung | 346/75 X |
| 3,988,745 | 10/1976 | Sultan | 346/140 |
| 4,021,818 | 5/1977 | Uloten | 346/140 |
| 4,024,544 | 5/1977 | Vernon | 346/140 X |
| 4,032,929 | 6/1977 | Fischbeck | 346/140 |
| 4,045,801 | 8/1977 | Iwasaki | 346/140 |
| 4,045,802 | 8/1977 | Fukazawa | 346/140 |
| 4,057,807 | 11/1977 | Fischbeck | 346/140 |
| 4,072,959 | 2/1978 | Elmqvist | 346/140 |
| 4,104,646 | 8/1978 | Fischbeck | 346/140 |
| 4,115,789 | 9/1978 | Fischbeck | 346/140 |
| 4,119,034 | 10/1978 | Wax | 346/140 X |
| 4,126,867 | 11/1978 | Stevenson | 346/140 |
| 4,131,899 | 12/1978 | Christou | 346/140 |
| 4,229,751 | 10/1980 | Tamai | 346/140 |

FOREIGN PATENT DOCUMENTS 54-143637 11/1979 Japan .......... 346/140

OTHER PUBLICATIONS

Cross, R. G.; Ribbonless Ink Printer; IBM TDB vol. 16, No. 1, Jun. 1973, p. 310.

Brownlow et al.; Ink on Demand Using Silicon Nozzles; IBM TDB, vol. 19, No. 6, Nov. 1976, pp. 2255–2256.

Lee et al.; High-Speed Droplet Generator; IBM TDB, vol. 15, No. 3, Aug. 1972, p. 909.

*Primary Examiner*—Joseph W. Hartary

*Attorney, Agent, or Firm*—Norman L. Norris; Dale Heist

[57] ABSTRACT

A device for forming and expelling a controlled quantity of liquid upon demand, such as an ink drop generating device, having a transducer deforming element for controlled deforming in response to an electrical signal, an orifice housing containing an orifice chamber which has an orifice opening at its front side and a relatively larger opening at its back side, the larger chamber opening being in direct communication with a liquid reservoir, the transducer deforming element and the orifice housing being closely positioned to provide direct interaction between the deforming element and the orifice chamber upon receipt of an electrical signal, the interaction causing generation of a liquid drop or other controlled quantity of liquid. Preferably the geometry of the orifice chamber and the deforming element are matched and the deforming element is oriented such that it may make contact with the orifice chamber when it deforms, which contact contributes to the generation of the controlled liquid quantity, or drop which is expelled from the orifice.

30 Claims, 13 Drawing Figures

DEMAND DROP FORMING DEVICE WITH INTERACTING TRANSDUCER AND ORIFICE COMBINATION

BACKGROUND OF THE INVENTION

This invention lies in the area of fluid ejection type writing devices, and, more particularly, an improved fast response pulse actuated drive mechanism for use in an ink jet system or the like.

The prior art discloses a wide variety of non-impact type printing systems utilizing the principle of expelling or ejecting writing fluid from an orifice or a nozzle in a controlled fashion toward a medium, such as paper, where printing is to occur. The principle of continuous jet printers, and the means for controlling same, are well documented in the technical and patent literature. Another form of non-impact printer is the demand, or impulse printer, which generates a drop of controlled group of drops of ink or printing fluid only in response to electrical control signals representing the the alphanumerical data to be printed. As is well known, this type of demand system has the advantage of eliminating much of the control means required for deflecting the ink in the continuous type of system, and obviates a recirculation system for catching and reusing generated ink drops which are not directed toward the printing medium.

While the ink jet type printer has achieved a great deal of commercial success, and has contributed to narrowing the gap between the time of printing at the output and the time of calculation required by present day computer systems, there is a great need for faster response time printers. An approach to increasing the response time has been the construction of closely packed arrays of ink jets or orifices, which are pulsed in a controlled fashion. Other work has been done to reduce the size of the drop, smaller drops leading to the capability of higher response time and greater resolution in the resulting printing. Other examples of prior art systems devised to improve response time and/or resolution are techniques for modulation of the control impulses which actuate the printing transducer, and techniques for controlling the trajectory of the drop from the drop generator to the printing medium. However, in general a limiting factor in achieving a higher response time has been the basic problem of actuating and controlling the inertia of the drive elements, or transducers which control the frequency and size of the ink drops. There remains a substantial need for an arrangement which enables smaller drive elements which can respond with greater controlability and at higher speeds, for fast production of optimal size drops of printing fluid.

SUMMARY OF THE INVENTION

It is an object of this invention to provide a pulsed drop generating pulse system for use in a printing device, which system minimizes the expenditure of energy and optimizes the time response in projecting ink drops or the like onto a printing medium.

It is another object of this invention to provide an improvment over prior art ink drop generating devices, which provides for a faster response time than heretofore available.

It is another object of this invention to provide a system for generating printing fluid droplets in a controlled manner, which system provides for the use of small and low inertia control elements, thereby providing a capability of a denser array of drop forming elements, resulting in a faster response time system.

It is another object of this invention to provide a drop generating device having a small dimensioned driver element for providing a high driving force concentrated on a small volume of printing fluid, e.g. ink.

It is another object of this invention to provide a generator for demand generation of ink drops, which generator operates without any static ink pressure and which is reliably controllable for expelling ink drops at speeds and frequencies adapted for high speed, high resolution non-impact printing.

It is another object of this invention to provide a system for producing ink drops on demand, which system eliminates or reduces the use of filters that are normally associated with the ink supply system.

It is another object of this invention to provide a demand ink jet system which enables a replacement of the ink supply without exposing the ink to the outside environment or contaminents.

It is another object of this invention to provide an ink jet system with means for replacing the ink reservoir without replacing the transducer.

It is another object of this invention to provide a combined reservoir and orifice in a non-impact printing system which projects writing fluid on a writing medium, which system comprises a permanent transducer.

It is yet another object of this invention to provide an ink jet generator adapted to seal off the ink supply from outside exposure between successive generations of ink drops.

In view of the above objects, there is provided a system adapted for generating and expelling a controlled quantity of liquid upon demand, comprising an actuable transducer element adapted to be deformed in response to an electrical control signal, in combination with an orifice housing designed to provide expulsion of controlled quantities of liquid, i.e., drops, from a reservoir providing such liquid, the deforming transducer and orifice housing having cooperating geometries and being normally positioned so that movement of said transducer by a small incremental distance relative to said orifice results in expelling the controlled quantity of liquid. By positioning the transducer means very close to the orifice, a low energy-high response drive system is produced, providing a substantial resolution of the prior art problem. The interaction between the transducer element and the orifice chamber may be solely a pressure interaction, the pressure being transmitted quickly through the fluid reservoir due to the small gap therebetween, or alternatively the interaction may involve contact of the transducer element with the orifice chamber for further control of the expelled quantity of ink.

DESCRIPTION OF THE PREFERRED EMBODIMENTS

Figure 1A:
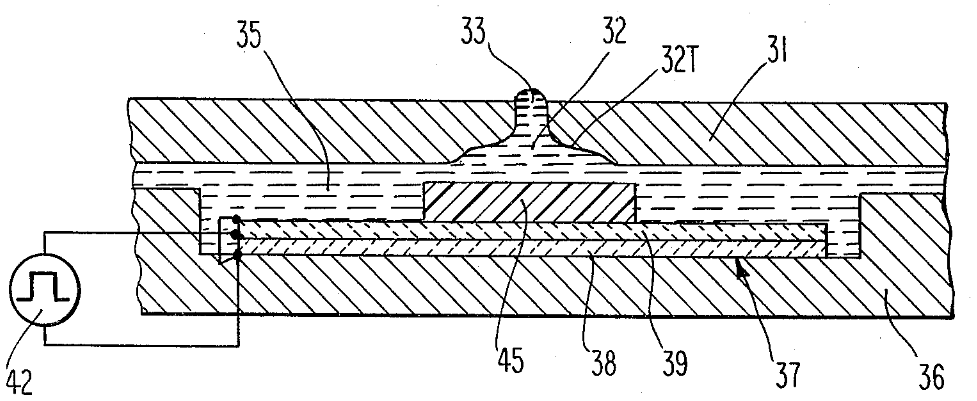
FIGS. 1A–1C are schematic cross-sectional sketches of the closely spaced drop producing system of this invention, showing sequentially the system in its static condition before it responds to an actuating impulse; the system intermediate the static condition drop production; and the system substantially at the time that a drop is expelled.
Figure 1B:
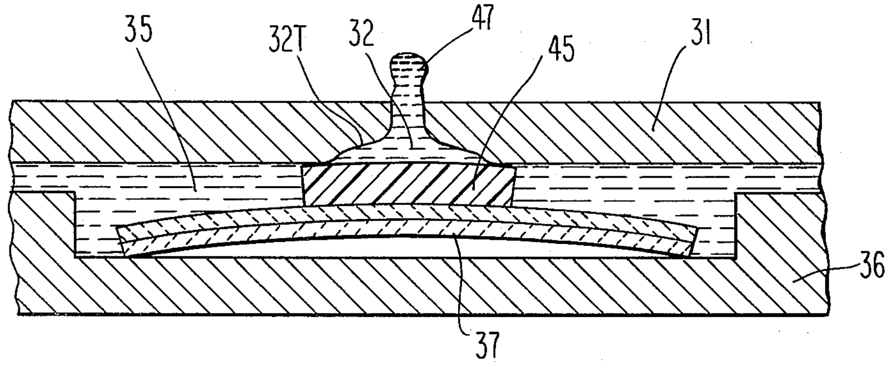
Figure 1C:
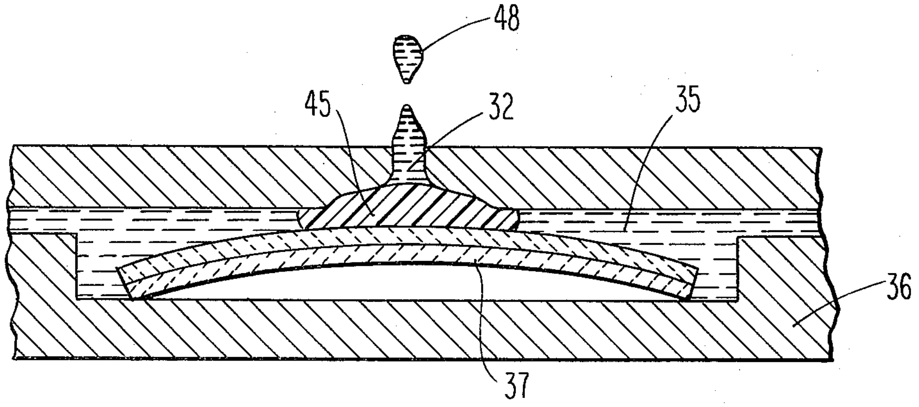

Referring now to FIGS. 1A–1C, there are shown three schematic cross-sectional sketches of a first embodiment of this invention, illustrating a drop producing or ink jet system for nonimpact printing in which an electromechanical transducer imparts a mechanical impulse on demand to the printing fluid or ink which is contained in a small reservoir region adjacent to the orifice from which the fluid is expelled. The sketch of FIG. 1A shows the device in a relaxed or non-pulsed state. An orifice plate 31 contains one or more orifices, only one orifice being illustrated for convenience. Plate 31 is shown containing an orifice chamber 32 having a curvilinear or tapered wall 32T through the width of orifice plate 31, such that chamber 32 has a relatively larger inside opening and a small outer opening, or orifice, 33. The size of the inner opening of orifice chamber 32, as well as the volume of chamber 32, is designed to interface with the transducer means as described more fully below in connection with FIGS. 1B and 1C. The size of orifice 33, from which drops exit, is dimensioned so as to control the size of the produced drops in the manner known in the art.

Opposite orifice plate 31 is a transducer 37, illustrated as having two flat electrically actuated driver transducer elements 38, 39. The transducer may be a bimorph (as illustrated) made by bonding two appropriately poled pieces of piezoelectric material together and connecting them integrally in a manner which causes the combination to bend when electrically excited. The piezoelectric bimorph may be either a flat disc or a relatively long and narrow strip. Other transducer configurations known in the art can be utilized, e.g., a monomorph consisting of a single piezoelectric material bonded to a non-active material of appropriate stiffness and thickness. The transducer, or driver 37 is actuated by impulse generator 42 which is shown schematically, and which may be a conventional pulse generator in combination with timing and logic circuitry. Transducer 37 is positioned against a blocking plate 36, plate 36 and transducer 37 providing an opposite wall from orifice plate 31, the two together defining therebetween a space filled with fluid such as ink and comprising reservoir 35. Spaces are illustrated at the ends of reservoir 35, for supplying the ink or other fluid from a supply not illustrated. The manner of supplying ink to the reservoir in drop printer devices is well known. Alternately, the space between the plate 31 and plate 36 may be sealed off to provide a self-contained replaceable reservoir, as discussed in connection with FIGS. 5A and 5B.

Still referring to FIG. 1A, there is illustrated a transducer piston 45 mounted centrally on transducer 37. The piston 45 is a resilient member, and has a size adapted to fit across the inner opening of orifice chamber 32 and be pushed into that chamber. It is important that transducer 37 and piston 45, which together form transducer means for providing mechanical movement in response to an electrical input, are positioned closely to the orifice chamber 32, leaving only a narrow gap, such that the small mechanical movement of the transducer means in response to electrical actuation brings the transducer means into a sufficiently close position with respect to chamber 32 so that fluid is forced out of the chamber.

Referring to FIGS. 1A–C in sequence, the manner of operation of the invention is illustrated. In the static condition shown in FIG. 1A, the ink fills the orifice chamber 32 and forms a meniscus at the orifice 33. When the transducer 37 receives a suitable electrical pulse, it moves axially toward orifice plate 31. FIG. 1B shows the transducer moved approximately midway during its fullest extension toward orifice 33. The resilient piston 45 pushes against the inner wall of the orifice plate, and suitably starts to actually push into chamber 32, causing liquid to be pushed out of chamber 32, as designated by the numeral 47. In FIG. 1C, transducer 37 is shown in its fully extended position, with resilient piston 45 extended into chamber 32 so as to assume a shape complementary to the chamber 32. Note that piston 45 seals chambers 32 off from the ink reservoir 35 and imparts a pressure impulse to the entrapped ink, causing the expulsion of drop 48. The ink or fluid drop ejection is affected by the contour 32T of the orifice chamber wall, and this contour and the size of the orifice chamber determine whether one or more drops of ink are ejected by the transducer impulse action. After the driver relaxes to the static position of FIG. 1A, the ink in chamber 32 is replenished from reservoir 35 by surface tension forces until the static condition is again attained.

It is to be noted that it is the closeness of the transducer means to the orifice plate which permits a quick and low energy generation of an ink drop or drops. The small distance between piston 45 and the inner surface of plate 31 leads to the quick response, and also results in low energy transmission of hydraulic pressure to the orifice 33, whether or not the piston actually deforms into chamber 32. The relative positioning of the transducer means and the orifice, combined with the deformation of the transducer means, combines to cause the expulsion of a controlled quantity of liquid in the form of one or more drops which move substantially axially away from orifice 33. The transducer means must be aligned so that upon actuation there is a resulting deformation with a component which is axial with respect to orifice 33, thereby causing the fluid pressure to have a vector which causes expulsion of one or more drops substantially normally from orifice plate 31.

It is to be understood that while only one orifice and one transducer element are illustrated in FIGS. 1A–1C, a plurality of orifices and corresponding transducers may be aligned in an array, for matrix production of drops in response to timed electrical signals. The electrical control of arrays is well known in the prior art.

Figure 2A:
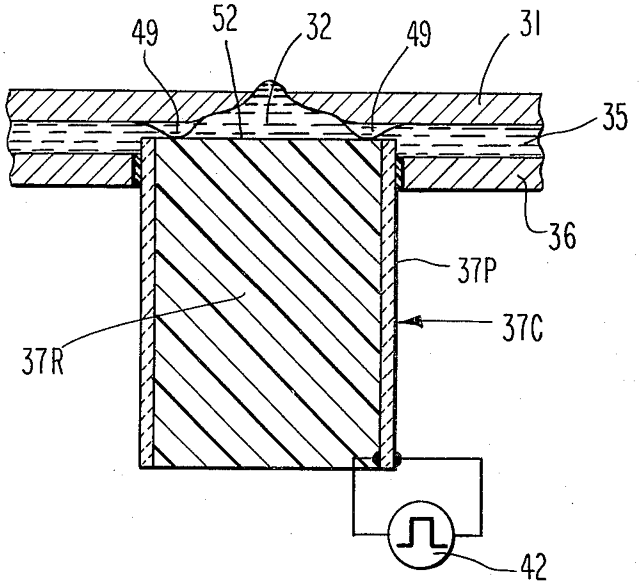
FIGS. 2A and 2B are schematic cross-sectional illustrations of an alternate embodiment of the invention utilizing a cylindrical transducer, in the static and pulsed conditions respectively.
Figure 2B:
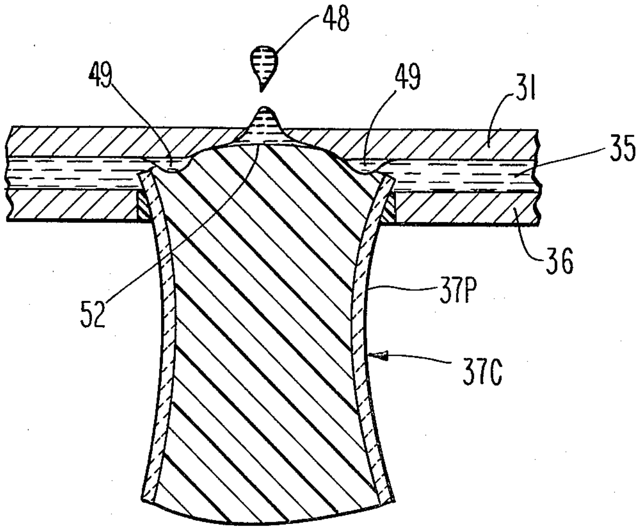

Referring now to FIGS. 2A and 2B, a second embodiment of this invention is illustrated, comprising a cylindrical transducer 37C having an axis of elongation parallel with the axis of the orifice chamber 32. The orifice plate 31, backing plate 36 and reservoir 35 are similarly arranged. The cylindrical transducer 37C comprises a piezoelectric cylinder 37P driven by pulse generator 42 for applying a pulse transverse to the axis of elongation, which cylinder is filled with a rubbery material 37R having an end face 52 which extends into reservoir 35. Orifice chamber 32 is illustrated as having substantially the same inner contour as illustrated in FIGS. 1A–1C, while plate 31 has bumps 49 around the inner opening of chamber 32 to maintain end face 52 of transducer 37 in fixed spacial relation with respect to orifice chamber 32. Back plate 36 suitably may have an opening to accomodate the cylindrical transducer or driver 37. As illustrated, the transducer fits loosely in the back plate opening with a meniscus of ink in the gap between transducer 37C and back plate 36.

FIG. 2B shows the cylindrical transducer 37C contracted in response to an electrical pulse, whereby the inner core 37R thereof is squeezed out at the end, such that end face 52 pushes over the spacer bumps 49 and into orifice chamber 32. The piston face seals the orifice chamber at its inner rim, and may expand further into the chamber, causing expulsion of an ink drop as illustrated at 48. When the electrical pulse terminates, the transducer relaxes to its normal size and the piston returns to the static condition illustrated in FIG. 2A, at which time the ink in chamber 32 is replenished by capillary forces.

It is to be noted that for both of the embodiments discussed thus far, drop formation is controlled on a demand basis, i.e., the apparatus provides drops only when and as needed and called for by control signals. Thus, there is no excess or unused drop production which requires a disposal system. In the invention of this application, the high driving forces available from the impulse driver, or transducer, are concentrated upon a small volume of fluid, such that the transducers can have extremely small dimensions, thereby permitting close spacing of the orifices in an array and contributing to a high resolution printing device.

Figure 3A:
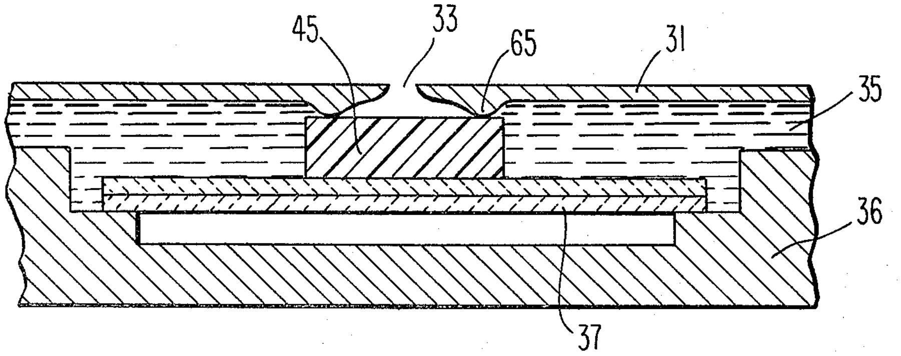
FIGS. 3A–3C represent schematic cross-sectional illustrations of an embodiment of this invention similar to FIGS. 1A–1C, but with the orifice normally sealed from fluid communication with the liquid reservoir.
Figure 3B:
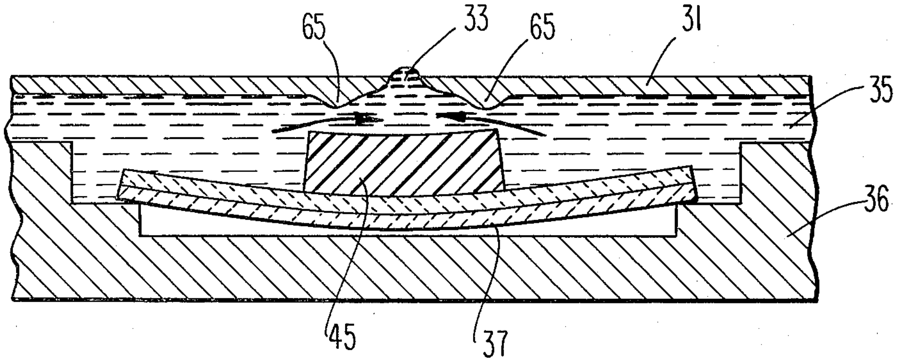
Figure 3C:
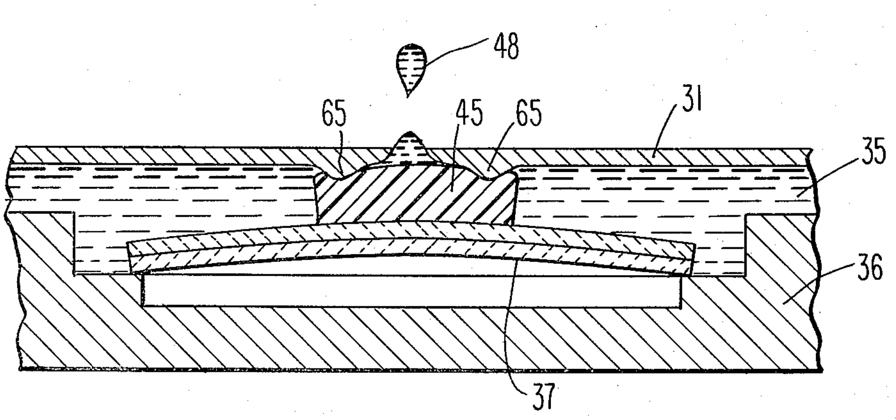

Referring now to FIGS. 3A–3C, there are presented sketches which illustrate another embodiment of this invention wherein the orifice is usually sealed off from the ink reservoir, the reservoir communicating with the orifice only when there is a demand for production of a drop. The arrangement of orifice plate 31, backing plate 36, transducer 37 and reservoir 35 is substantially as presented in FIGS. 1A–1C. However, orifice plate 31 has positioned on its inner surface an annular rim, or projection 65 which essentially extends the boundary of orifice chamber 32 inwardly into the reservoir beyond the normal inner wall of plate 31. In the relaxed condition, piston 45 connected to transducer 37 is just in contact with annular rim 65, thereby sealing or shutting off the reservoir 35 from the orifice 33. When a drop production is demanded, the electrical impulse generator, not shown, first pulses the transducer to deform in the manner shown in FIG. 3B, drawing the piston away from annular rim 65 such that ink can flow from the reservoir toward the orifice 33, as indicated by the arrows. At this instant, ink reaches orifice 33 and forms a meniscus, but there is no pressure to actually expell ink from the orifice. After this, the electrical driving signal to transducer 37 reverses in polarity, causing a deformation of the transducer in an opposite direction, as shown in FIG. 3C. When this happens, piston 45 is driven toward and into the orifice chamber, causing expulsion of a drop 48 in a manner similar to that illustrated in FIGS. 1A–1C. Following this, the electrical signal is removed, and the transducer relaxes to its normal position in FIG. 3A. with little or no ink remaining between orifice 33 and the piston 45. Thus, when no drop is being generated, the ink reservoir does not communicate with the atmosphere, and is therefore sealed off from contaminants.

As is illustrated by the Figures, the movement required by transducer 37 and piston 45 is relatively small, due to the fact that the piston surface rests lightly against rim 65 in the inactive state. Accordingly, only a small deformation of the piston is required to permit passage of ink from the reservoir toward the orifice, and only a correspondingly small deformation in the opposite direction is required to provide the pressure necessary to expell a drop out of orifice 33. It is, of course, necessary to control the timing of the electrical impulse signal so that the transducer drive polarity is reversed only after enough ink has entered the orifice chamber to provide a drop 48 of suitable size.

Figure 4A:
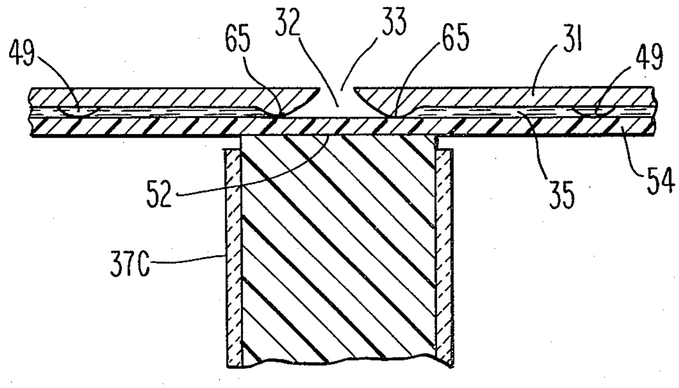
FIGS. 4A–4C are schematic cross-sectional illustrations of an alternate embodiment corresponding to FIGS. 3A–3C, showing a cylindrical transducer.
Figure 4B:
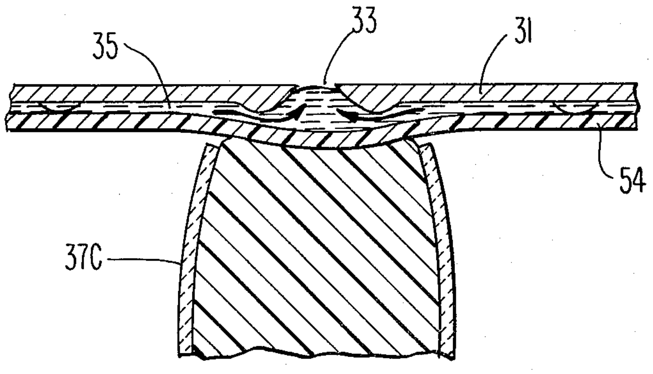
Figure 4C:
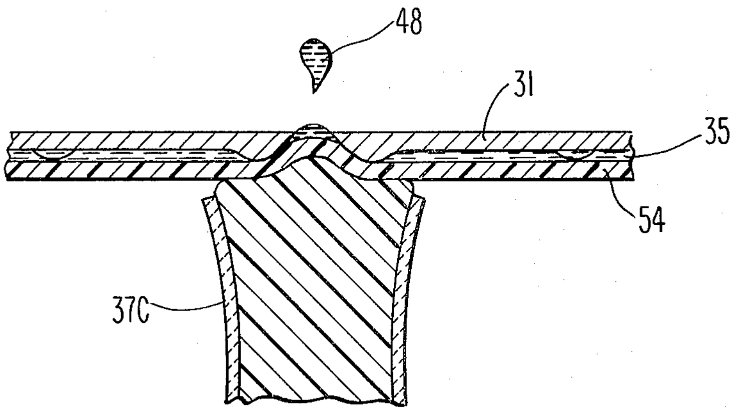

Referring to FIGS. 4A–4C, there is shown an alternate form of ink drop generating apparatus wherein the ink supply is normally sealed off from the orifice, and embodying an elongated cylindrical transducer 37C of the same type illustrated in FIGS. 2A and 2B. A flexible membrane 54 forms the back wall of the reservoir 35, such that the reservoir and orifice structure may be part of an easily replaceable ink supply structure. Annular rim 65 and spacer bumps 49 maintain the membrane 54 at a fixed small incremental distance from orifice 33. When a signal is received calling for production of an ink drop, the transducer first deforms as shown in FIG. 4B, to allow ink to flow from the reservoir 35 to orifice 33, as indicated by the arrows. The polarity of the transducer drive signal is then reversed, causing the end face 52 of the transducer 37C to push the membrane 54 toward and into up into the orifice chamber 32, as illustrated in FIG. 4C. This small drive force causes expulsion of the drop 48 from the orifice, after which the transducer relaxes to the static condition shown in FIG. 4A. Alternately, in the static condition pressure may be applied to the fluid in reservoir 35 and the transducer positioned to permit communication from the reservoir to the orifice 35. Control would then be achieved by normally driving the transducer into a sealed condition similar to FIG. 4A wherein no drops can be expelled, and relaxing the transducer for short time increments in order to produce drops.

Figure 5A:
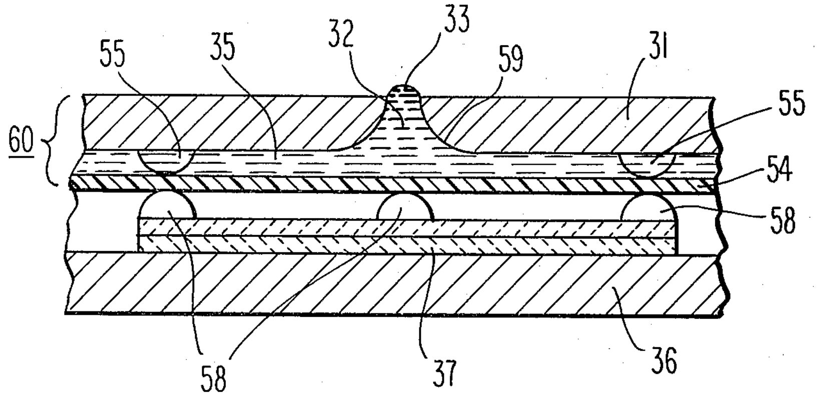
FIGS. 5A and 5B are schematic cross-sectional sketches which illustrate another embodiment having a removable combined reservoir and orifice means.
Figure 5B:
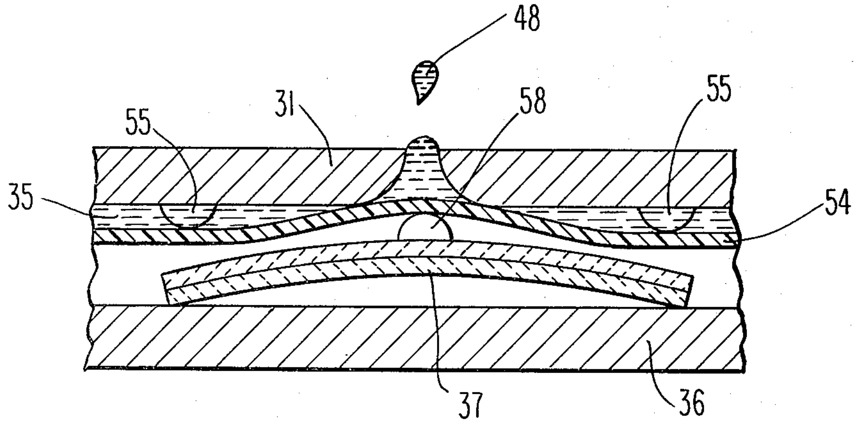

Another embodiment of the invention is illustrated in the sketches of FIGS. 5A and 5B. These Figures show a drop forming apparatus for ink drop printing in which the transducer or impulse driver 37 is permanently mounted with the apparatus, and is coupled to a replaceable reservoir and orifice combination 60. Combination 60 is comprised of orifice plate 31 and flexible membrane 54, which define therebetween reservoir 35. Membrane 54 is normally held a fixed distance from the inner wall of plate 31 by means of spacer bumps 55. The replaceable combination 60 is attached to the permanent portion of drop the forming apparatus by fasteners or mechanical attachment means not shown, of a conventional nature. Transducer 37 is positioned on the other side of membrane 54 away from reservoir 35, and is spaced from membrane 54 by transducer spacers 58, as illustrated. When the transducer is pulsed, by electrical pulse means not shown, it deforms as illustrated in FIG. 5B, causing central spacer 58 to thrust resillient membrane 54 axially into chamber 32, causing expulsion of a drop or drops 48. The important additional feature of this embodiment is that the combination 60 is replaceable, meaning that ink can be replenished without any exposure of ink to the atmosphere or contaminants, while maintaining the transducer and control elements permanently affixed to the printing apparatus. This permits keeping the ink supply system free of material which will clog the holes, such as particles which may enter the ink from the environment, since the ink supply system can be replaced without exposing it to any contamination whatsoever. Although not illustrated, it is to be noted a cylindrical transducer assembly 37C such as illustrated in FIGS. 2A–2B and 4A–4C may also be utilized in combination with the replaceable orifice-reservoir unit 60.

What is claimed is:

1. An ink jet system adapted for ejecting a, droplet of ink upon demand, comprising:

a. deforming means for controlled deforming upon demand, said deforming means comprising a first actuatable portion adapted to be deformed on demand and a second portion coupled to said first portion;
b. an orifice housing containing an orifice chamber which terminates in an orifice;
c. a reservoir containing said ink;
d. said orifice housing being positioned to define generally one side of said reservoir, and said second portion of said deforming means being positioned on the opposite side of said reservoir from said orifice housing, and said second portion being further positioned closely to but outside said orifice chamber and oriented such that it pushes toward and substantially into said orifice chamber during said controlled deforming, thereby causing a droplet of ink to be ejected from said orifice.

2. The system as described in claim 1, wherein said first portion comprises an electromechanical transducer of a generally flat configuration.

3. The system as described in claim 1, wherein said first portion comprises a transducer of generally cylindrical configuration.

4. The system as described in claim 1, wherein said first portion comprises an electrically activated transducer drive element and said second portion comprises a resilient piston element, said piston element being mounted on said transducer such that it is pushed into said orifice chamber during said controlled deforming.

5. The system as described in claim 1, wherein said first portion is adapted to be deformed on demand when pulsed with an electrical signal, and said second portion is integrally attached to said first portion and extending into said reservoir, said second portion being aligned axially with said orifice chamber, whereby when said first portion is deformed said second portion moves axially into said orifice chamber.

6. The system as described in claim 1, wherein said deforming means is adapted to deform with an incremental motion axially toward said orifice, and said second portion is positioned a distance from said orifice chamber which is less than said incremental distance.

7. The system as described in claim 1, wherein said orifice housing comprises an orifice plate, and said reservoir is on the inside of said orifice plate and said orifice is an opening on the outside of said orifice plate.

8. The system as described in claim 1, wherein said orifice chamber and said deforming means have complementary shapes whereby said deforming means is adapted to push into said orifice chamber upon said controlled deforming.

9. The system as described in claim 1, wherein said orifice chamber has a relatively larger cross-sectional area in communication with said reservoir, and tapers to a relatively smaller orifice where said liquid is expelled.

10. The system as described in claim 1, wherein the volume of said orifice chamber adapted to receive said deforming means is substantially equivalent to said controlled quantity of liquid.

11. The system as described in claim 1, wherein said reservoir and said orifice housing are integral and are removable from the remainder of said system.

12. The system as described in claim 1, wherein said second portion comprises a flexible member positioned between said first portion and said orifice housing and defining said side of said reservoir opposite said orifice housing.

13. The system as described in claim 1, wherein said reservoir is normally in communication with said orifice chamber.

14. The system as described in claim 1, wherein said orifice housing and said deforming means are combined such that said reservoir is normally sealed from said orifice chamber.

15. An ink jet system for demand ejecting drops of ink, comprising:

a. a reservoir containing ink;
b. orifice housing means for providing an orifice through which ink drops are expelled, said orifice housing means comprising an orifice chamber opening adapted to receive ink from said reservoir;
c. deforming means and means for actuating said deforming means;
d. said deforming means being positioned opposite and outside said orifice chamber during filling and in direct communication therewith such that said deforming means extends substantially into said orifice chamber to eject a droplet of ink after filling.

16. A system as described in claim 15 wherein said deforming means is characterized by an axis of elongation axially aligned with said orifice chamber.

17. The system of claim 16 wherein said means for actuating applies a signal to said deforming means transverse to said axis of elongation.

18. The system of claim 15 wherein said deforming means comprises a first actuatable portion coupled to said means for actuating and a second portion.

19. The system of claim 18 wherein said means for actuating applies an electrical signal to said actuatable portion transverse to said axis of elongation.

20. The system of claim 19 wherein said second portion comprises a flexible member extending transverse to the axis of said orifice chamber.

21. The system of claim 15 wherein said deforming means comprises a flexible member extending transverse to the axis of said chamber.

22. The system of claim 21 wherein deformation of said deforming means retracts said flexible member away from said orifice chamber for filling of said chamber from said reservoir and extends said flexible member toward said orifice to expel a droplet of ink from said chamber.

23. An ink jet system for demand ejecting drops of ink, comprising:

a. an orifice element providing an orifice chamber extending axially from an inside opening to an outside orifice;

b. reservoir means positioned relative to said orifice chamber for supplying ink thereto;
c. deforming means positioned to extend into said reservoir and positioned an incremental distance from said inside opening; and
d. said deforming means being actuable to move from a position spaced from said orifice chamber substantially axially toward and substantially into said orifice chamber to eject a droplet, said orifice element and said deforming means defining the access path from said reservoir to said orifice chamber.

24. The system as described in claim 23, wherein said deforming means is adapted to move axially toward said orifice chamber an incremental distance such as causes expulsion of a limited amount of ink while a remaining amount of ink is maintained in said orifice chamber.

25. The system as described in claim 24, wherein said deforming member is adapted to move so that at the furthest movement thereof it is a predetermined distance from said orifice chamber.

26. The system as described in claim 23, wherein the cross-sectional area of said orifice chamber varies as a function of distance from said orifice.

27. The system as described in claim 23, wherein said orifice chamber has a volume substantially less than that of said reservoir.

28. An ink jet system adapted for ejecting a droplet of ink comprising:
a. deforming means for controlled deforming and actuating means for delivering an actuating signal to said deforming means to cause said deforming;
b. an orifice housing containing at least one orifice;
c. said orifice housing and said deforming means being combined and positioned to define therebetween a reservoir, said reservoir containing said liquid;
d. said deforming means having a portion outside said orifice which extends substantially into said orifice chamber and contacts the inner edge of said orifice such that said reservoir is normally sealed from fluid communication with said orifice when a droplet is ejected.

29. The system as described in claim 28, wherein said deforming means is actuated to retract away from said orifice to permit fluid communication from said reservoir to said orifice, and said portion is adapted to penetrate into said orifice.

30. An ink jet system adapted for ejecting a droplet of ink upon demand, comprising:
a. deforming means for controlled deforming upon demand;
b. an orifice housing containing at least one orifice;
c. a reservoir containing said liquid;
d. said orifice housing being positioned to define generally one side of said reservoir, and said deforming means being positioned on the opposite side of said reservoir from said orifice housing, and said deforming means being further positioned a predetermined distance from said orifice and oriented such that it pushes toward and substantially into said orifice by about said predetermined distance during said controlled deforming, thereby causing a a droplet of ink to be ejected.

* * * * *